US008589679B2

(12) United States Patent
Chen et al.

(10) Patent No.: US 8,589,679 B2
(45) Date of Patent: Nov. 19, 2013

(54) IDENTIFIER-BASED SIGNCRYPTION WITH TWO TRUSTED AUTHORITIES

(75) Inventors: Liqun Chen, Bristol (GB); Keith Alexander Harrison, Monmouthshire (GB); John Malone-Lee, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2442 days.

(21) Appl. No.: 11/182,527

(22) Filed: Jul. 14, 2005

(65) Prior Publication Data

US 2006/0026426 A1    Feb. 2, 2006

(30) Foreign Application Priority Data

Jul. 15, 2004  (GB) .................................. 0415774.9

(51) Int. Cl.
*H04L 29/06* (2006.01)
(52) U.S. Cl.
USPC ......................................................... 713/165
(58) Field of Classification Search
USPC ......................................................... 713/165
See application file for complete search history.

(56) References Cited

U.S. PATENT DOCUMENTS

| | | | | |
|---|---|---|---|---|
| 6,396,928 | B1 | 5/2002 | Zheng | 380/285 |
| 2003/0091192 | A1* | 5/2003 | Chen et al. | 380/277 |
| 2003/0179885 | A1 | 9/2003 | Gentry et al. | 380/277 |
| 2004/0131191 | A1* | 7/2004 | Chen et al. | 380/282 |
| 2005/0022102 | A1* | 1/2005 | Gentry | 715/500 |
| 2005/0102507 | A1* | 5/2005 | Sozzani et al. | 713/165 |

FOREIGN PATENT DOCUMENTS

| | | |
|---|---|---|
| GB | 2 390 516 A | 1/2004 |
| WO | 03/017559 A2 | 2/2003 |

OTHER PUBLICATIONS

Boneh, D., et al., "Identity-Based Encryption from the Weil Pairing," *Advances in Cryptology—CRYPT 2001*, LNCS 2139, pp. 213-229, Springer-Verlag (2001).
Boyen, X., "Multipurpose Identity-Based Signcryption," *Proc. 23rd International Conf. in Cryptology (CRYPTO '03)*, LNCS series, Springer Verlag, 2003. Available online from: http://www.springer.de/comp/lncs/index.html.
Cha, J.C., et al., "An Identity-Based Signature from Gap Diffie-Hellman Groups," *Proceedings of the 6th International Workshop on Theory and Practice in Public Key Public Key Cryptography*, pp. 18-30, Jan. 6-8, 2001.
Frey, G., et al., "The Tate Pairing and the Discreet Logarithm Applied to Elliptic Curve Cryptosystems," *IEEE Transactions on Information Theory* 45(5): pp. 1717-1719 (1999).
Libert, B., et al, "A new identity based signcryption scheme from pairings," *IEEE Information Theory Workshop*, pp. 155-158 (2003).
Nalla, D., et al., "Signcryption Scheme for Identity-based Cryptosystems," accessed via Internet at <http://citeseer.ist.psu.edu/nalla03signcyption.html> (Apr. 9, 2003).

\* cited by examiner

*Primary Examiner* — Philip Chea
*Assistant Examiner* — Daniel Hoang

(57) ABSTRACT

Identifier-based signcryption methods and apparatus are disclosed both for signing and encrypting data, and for decrypting and verifying data. The signcryption methods use computable bilinear mappings and can be based, for example, on Weil or Tate pairings. A message sender associated with a first trusted authority carries out integrated signing/encryption processes to send a signed, encrypted message to an intended recipient associated with a second trusted authority. The recipient then carries out integrated decryption/verification processes to recover the original message and verify its origin.

23 Claims, 3 Drawing Sheets

IDENTIFIER-BASED SIGNCRYPTION WITH TWO TRUSTED AUTHORITIES

CROSS-REFERENCE TO RELATED APPLICATIONS

The subject matter of the present application may also be related to the following U.S. Patent Application: "Identifier-Based Signcryption," Ser. No. 10/977,342, filed Oct. 29, 2004.

FIELD OF THE INVENTION

The present invention relates to methods and apparatus for implementing an identifier-based signcryption cryptographic scheme with two trusted authorities. A "signcryption" scheme is one that combines both data encryption and signature to obtain private and authenticated communications.

BACKGROUND OF THE INVENTION

As is well known to persons skilled in the art, in "identifier-based" cryptographic (IBC) methods a public, cryptographically unconstrained, string is used in conjunction with a public key of a trusted authority to carry out tasks such as data encryption and signing. The complementary tasks, such as decryption and signature verification, require the involvement of the trusted authority to carry out a computation based on the public string and a private key that is related to its public data. In message-signing applications and frequently also in message encryption applications, the string serves to "identify" a party (the sender in signing applications, the intended recipient in encryption applications); this has given rise to the use of the label "identifier-based" or "identity-based" generally for these cryptographic methods. However, at least in certain encryption applications, the string may serve a different purpose to that of identifying the intended recipient and, indeed, may be an arbitrary string having no other purpose than to form the basis of the cryptographic processes. Accordingly, the use of the term "identity-based" or "identifier-based" herein in relation to cryptographic methods and systems is to be understood simply as implying that the methods and systems are based on the use of a cryptographically unconstrained string whether or not the string serves to identify the intended recipient. Furthermore, as used herein the term "string" is simply intended to imply an ordered series of bits whether derived from a character string, a serialized image bit map, a digitized sound signal, or any other data source.

The current most practical approach to building identifier-based cryptosystems uses bilinear pairings. A brief overview of pairings-based cryptography will next be given. In the present specification, $G_1$ and $G_2$ denote two algebraic groups of large prime order l in which the discrete logarithm problem is believed to be hard and for which there exists a non-degenerate computable bilinear map p, for example, a Tate pairing or Weil pairing. Note that $G_1$ is a [l]-torsion subgroup of a larger algebraic group $G_0$ and satisfies $[l]P=O$ for all $P \in G_1$ where O is the identity element, l is a large prime, and l*cofactor=number of elements in $G_0$. The group $G_2$ is a subgroup of a multiplicative group of a finite field.

For the Weil pairing: the bilinear map p is expressed as $p: G_1 \times G_1 \to G_2$.

The Tate pairing can be similarly expressed though it is possible for it to be of asymmetric form:

$p: G_1 \times G_0 \to G_2$

Generally, the elements of the groups $G_0$ and $G_1$ are points on an elliptic curve (typically, though not necessarily, a supersingular elliptic curve); however, this is not necessarily the case.

For convenience, the examples given below assume the use of a symmetric bilinear map (p: $G_1 \times G_1 \to G_2$) with the elements of $G_1$ being points on an elliptic curve; however, these particularities, are not to be taken as limitations on the scope of the present invention.

As is well known to persons skilled in the art, for cryptographic purposes, modified forms of the Weil and Tate pairings are used that ensure $p(P,P) \neq 1$ where $P \in G_1$; however, for convenience, the pairings are referred to below simply by their usual names without labeling them as modified.

As the mapping between $G_1$ and $G_2$ is bilinear, exponents/multipliers can be moved around. For example if a, b, c∈Z (where Z is the set of all integers) and P, Q∈$G_1$ then $$p(aP, bQ)^c = p(aP, cQ)^b = p(bP, cQ)^a = p(bP, aQ)^c$$
$$= p(cP, aQ)^b = p(cP, bQ)^a = p(abP, Q)^c$$
$$= p(abP, cQ) = p(P, abQ)^c = p(cP, abQ) = \ldots$$
$$= p(abcP, Q) = p(P, abcQ) = p(P, Q)^{abc}$$

A normal public/private key pair can be defined for a trusted authority:
  the private key is s
    where s∈$Z_l$ and
  the public key is (P, R)
    where P and R are respectively master and derived public elements with $P \in G_1$ and $R \in G_1$, P and R being related by R=sP With the cooperation of the trusted authority, an identifier-based public key/private key pair <$Q_{ID}$, $S_{ID}$> can be defined for a party with identity string ID where:

$Q_{ID}, S_{ID} \in G_1$.

$S_{ID} = sQ_{ID}$ $Q_{ID} = H_1(ID)$ $H_1$ is a hash: $\{0,1\}^* \to G_1$

Further background regarding Weil and Tate pairings and their cryptographic uses (such as for encryption and signing) can be found in the following references:
  G. Frey, M. Müller, and H. Rück. The Tate pairing and the discrete logarithm applied to elliptic curve cryptosystems. *IEEE Transactions on Information Theory*, 45(5): 1717-1719, 1999.
  D. Boneh and M. Franklin. Identity based encryption from the Weil pairing. In *Advances in Cryptology—CRYPTO 2001*, LNCS 2139, pp. 213-229, Springer-Verlag, 2001.

With regard to the latter reference, it may be noted that this reference describes both a fully secure encryption scheme using the Weil pairing and, as an aid to understanding this fully-secure scheme, a simpler scheme referred to as "BasicIdent" which is acknowledged not to be secure against a chosen ciphertext attack.

As already mentioned above, the present invention is concerned with signcryption cryptographic schemes. A "signcryption" primitive was proposed by Zheng in 1997 in the paper: "Digital Signcryption or How to Achieve Cost(Signature & Encryption)<<Cost(Signature)+Cost(Encryption)." Y. Zheng, in Advances in Cryptology—CRYPTO '97, volume 1294 of Lecture Notes in Computer Science, pages 165-179, Springer-Verlag, 1997. This paper also proposed a discrete logarithm based scheme.

Identity-based signcryption is signcryption that uses identity-based cryptographic algorithms. A number of identity-based signcryption schemes have been proposed such as described in the paper "Multipurpose Identity-Based Signcryption: A Swiss Army Knife for Identity-Based Cryptography" X. Boyen, in Advances in Cryptology—CRYPTO 2003, volume 2729 of Lecture Notes in Computer Science, pages 382-398, Springer-Verlag, 2003. This paper also proposes a security model for identity-based signcryption that is based on six algorithms SETUP, EXTRACT, ENCRYPT, DECRYPT and VERIFY. For convenience of describing the prior art and the preferred embodiments of the invention, a similar set of six algorithms is used herein and the functions of each of these algorithms will now be described with reference to FIG. 1 of the accompanying drawings; it should, however, be understood that the present invention is not intended to be limited to implementations using such a set of six algorithms.

In FIG. 1 the algorithms SETUP 20 and EXTRACT 21 are associated with a trusted authority, the algorithms SIGN 22 and ENCRYPT 23 with a party A, and the algorithms DECRYPT 24 and VERIFY 25 with a party B. The functions of these algorithms are as follows:

SETUP—On input of a security parameter k this algorithm produces a pair <params, s> where "params" are the global public parameters for the system and s is the master secret key. The public parameters "params" include a global public key R, a description of a finite message space M, a description of a finite signature space S, and a description of a finite ciphertext space C. It is assumed below that "params" are publicly known and are therefore not explicitly provided as input to the other algorithms.

EXTRACT—On input of an identity $ID_U$ and the master secret key s, this algorithm computes a secret key $S_U$ corresponding to $ID_U$.

SIGN—On input of $<m, S_A>$, this algorithm produces a signature σ on m under $ID_A$ and some ephemeral state data r.

ENCRYPT—On input of $<S_A, ID_B, m, \sigma, r>$, this algorithm produces a ciphertext c. This is the encryption under $ID_B$'s public key of m and of $ID_A$'s signature on m.

DECRYPT—on input of $<c, S_B>$, this algorithm produces $(m', ID_A', \sigma')$ where m' is a message and σ' is a purported signature on m' of party with identity $ID_A'$.

VERIFY—On input of $<m', ID_A', \sigma'>$, this algorithm outputs True if σ is the signature of the party represented by $ID_A$ on m, and it outputs False otherwise.

The marking of a quantity with ' (as in m') is to indicate that its equivalence to the unmarked quantity has to be tested.

The above individual algorithms 20 to 25 have the following consistency requirement. If:

$(m,\sigma,r) \leftarrow SIGN(m,S_A)$ $c \leftarrow ENCRYPT(S_A, ID_B, m, \sigma, r)$ $(m', ID_A', \sigma') \leftarrow DECRYPT(c, S_B)$ Then the following must hold:

$ID_A' = ID_A$ $m' = m$ $True \leftarrow VERIFY(m', ID_A', \sigma')$

It should be noted that other ways of modelling identity-based signcryption exist; for example, the signing and encryption algorithms may be treated as a single signcryption algorithm as are the decryption and verification algorithms. However, the above-described model will be used in the present specification.

The implementation of a signcryption scheme using the above six algorithms is straight-forward:

a trusted authority first executes SETUP;

the trusted authority executes EXTRACT to provide party A with the latter's secret key $S_A$;

party A executes SIGN to form a signature σ on a message m, and ENCRYPT to encrypt the message m together with the signature;

the trusted authority executes EXTRACT to provide party B with the latter's secret key $S_B$;

party B executes DECRYPT to recover m', σ' and a sender identity, and then VERIFY to verify the signature.

It will be appreciated that the execution of EXTRACT to provide $S_B$ can be carried out at any time before DECRYPT is run.

The specific identity-based signcryption scheme described in the above-referenced paper by Boyen is based on bilinear pairings with the algorithms being implemented as follows:

Setup

Establish public parameters $G_1$, $G_2$, l, q and the following cryptographic hash functions:

$H_1: \{0,1\}^{k_1} \rightarrow G_1$ $H_2: \{0,1\}^{k_0+n} \rightarrow Z_l^*$ $H_3: G_2 \rightarrow \{0,1\}^{k_0}$ $H_4: G_2 \rightarrow Z_l^*$ $H_5: G_1 \rightarrow \{0,1\}^{k_1+n}$ where:

$k_0$ is the number of bits required to represent an element of $G_1$;

$k_1$ is the number of bits required to represent an identity; and n is the number of bits of a message to be signed and encrypted.

Choose P such that $<P> = G_1$ that is, P is a generator for the cyclic group $G_1$.

Choose s uniformly at random from $Z_l^*$.

Compute the global public key $R \leftarrow sP$.

Extract

To extract the private key for user U with $ID_U \in \{0,1\}^{k_1}$:

compute the public key $Q_U \leftarrow H_1(ID_U)$ compute the secret key $S_U \leftarrow sQ_U$ Sign For user A with identity $ID_A$ to sign a message $m \in \{0,1\}^n$ with private key $S_A$ corresponding to public key $Q_A \leftarrow H_1(ID_A)$:

choose r uniformly at random from $Z_l^*$ and compute:

$X \leftarrow rQ_A$ compute:

$h \leftarrow H_2(X\|m)$ where ∥ indicates concatenation $J \leftarrow (r+h)S_A$ return r and the signature $\sigma = <X, J>$.

Encrypt

For user A with identity $ID_A$ to encrypt message m, using r and σ output by SIGN, for user B with identity $ID_B$:

compute:

$$Q_B \leftarrow H_1(ID_B)$$

$$w \leftarrow p(S_A, Q_B)$$

$$t \leftarrow H_4(w)$$

$$Y \leftarrow tX$$

$$u \leftarrow w^r$$

compute:

$$f = H_3(u) \oplus J$$

$$v = H_5(J) \oplus (ID_A \| m)$$

return the ciphertext c: $<Y, f, v>$.

Decrypt

For user B with identity $ID_B$ to decrypt ciphertext c': $<Y', f', v'>$ using $S_B \leftarrow H_1(ID_B)$:

compute:

$$u' \leftarrow p(Y', S_B)$$

$$J' \leftarrow f' \oplus H_3(u')$$

compute:

$$H_5(J') \oplus v'$$

to recover string: $ID_A' \| m'$ compute:

$$Q_A' \leftarrow H_1(ID_A')$$

$$w' \leftarrow p(Q_A', S_B)$$

$$t' \leftarrow H_4(w')$$

$$X' \leftarrow (t')^{-1} Y$$

return the message m', the signature σ'=$<X', J'>$, and the identity $ID_A'$ of the purported sender.

Verify

To verify that the signature σ' on message m' is that of user A where A has identity $ID_A$:

compute:

$$h' \leftarrow H_2(X' \| m')$$

check whether:

$$p(J', P) = p(R, X' + h' Q_A')$$

and, if so, return True, else return False.

The foregoing signature algorithm SIGN is based on an efficient signature scheme proposed in the paper "An Identity-Based Signature from Gap Diffie-Hellman Groups" J. C. Cha and J. H. Cheon, in Public Key Cryptography—PKC 2003, volume 2567 of Lecture Notes in Computer Science, pages 18-30, Springer-Verlag, 2003.

Our co-pending U.S. patent application Ser. No. 10/977,342 filed Oct. 29, 2004 discloses an identity-based signcryption scheme that uses bilinear maps and provides improved efficiency. However, the signcryption scheme disclosed in that application involves the message sender and message receiver using the same trusted authority. In many practical applications, the message sender and message recipient will belong to different trusted-authority domains. Prior IBC solutions for such situations generally involve separate identity-based signature and encryption schemes with each scheme using the trusted authorities of both the message sender and receiver.

It is an object of the invention to provide a signcryption scheme where the message sender and message receiver belong to different trusted-authority domains.

SUMMARY OF THE INVENTION

According to one aspect of the present invention, there is provided an identifier-based signcryption method using bilinear maps, in which a first party associated with a first identifier string $ID_A$ signcrypts data m intended for a second party associated with a second identifier string $ID_B$, the first and second parties being respectively associated with first and second trusted authorities that have different respective public keys and different respective private keys $s_1$ and $s_2$; the method comprising:

the first trusted authority providing the first party with a private-key element $S_A$ based on the first identifier string $ID_A$ and the first trusted party's private key $s_1$, and the first party signcrypting the data m using at least the public keys of the first and second trusted authorities, its own private-key element $S_A$ and the second identifier string $ID_B$.

In one preferred embodiment, the public keys of the two trusted authorities have a common master element P as well as different derived elements $R_{T1}$, $R_{T2}$ formed by combining the selected element with their respective private keys. More particularly, in this preferred embodiment, the public key of the first trusted authority comprises elements P and $R_{T1}$ where $R_{T1}=s_1 P$, and the public key of the second trusted authority comprises the element P and an element $R_{T2}$ where $R_{T2}=s_2 P$; the private-key element $S_A$ of the first party being formed as $s_1 Q_A$ where $Q_A$ is an element formed from the first identifier string $ID_A$, and the second party having an associated element $Q_B$ formed from the second identifier string $ID_B$, said elements being members of an algebraic group $G_0$ with at least the elements P, $R_{T1}$ and $R_{T2}$ being in a subgroup $G_1$ of $G_0$ where $G_1$ is of prime order l and in respect of which there exists a computable bilinear map p; the first party signcrypting the data m by a process comprising:

(a) signing m by computing:

$$X \leftarrow rP$$

where r is randomly chosen in $Z_l^*$;

$$h \leftarrow H_2(C_1(\text{at least } X \text{ and } m))$$

where $H_2$: $\{0,1\}^* \rightarrow Z_l$ and $C_1()$ is a deterministic combination function, $$J \leftarrow (rR_{T1} + hS_A)$$

(b) encrypting m and signature data by computing:

w as the bilinear mapping of elements $Q_B$, and $rR_{T2}$, and $$f \leftarrow Enc(w, C_2(\text{at least } J \text{ and } m))$$

where Enc( ) is a symmetric-key encryption function using w as key, and $C_2()$ is a reversible combination function;

(c) outputting ciphertext comprising X and f.

In a further preferred embodiment, the public keys of the two trusted authorities have different master elements $P_{T1}$, $P_{T2}$ as well as different derived elements $R_{T1}$, $R_{T2}$. More particularly, in this further preferred embodiment, the public key of the first trusted authority comprises an element $P_{T1}$ and an element $R_{T1}$ where $R_{T1}=s_1 P_{T1}$, and the public key of the second trusted authority comprises an element $P_{T2}$ and an element $R_{T2}$ where $R_{T2}=s_2P_{T2}$; the private-key element $S_A$ of the first party being formed as $s_1Q_A$ where $Q_A$ is an element formed from the first identifier string $ID_A$, and the second party having an associated element $Q_B$ formed from the second identifier string $ID_B$, said elements being members of an algebraic group $G_0$ with at least the elements $P_{T1}, P_{T2}, R_{T1}$ and $R_{T2}$ being in a subgroup $G_1$ of $G_0$ where $G_1$ is of prime order l and in respect of which there exists a computable bilinear map p; the first party signcrypting the data m by a process comprising:

(a) signing m by computing:

$$X_1 \leftarrow rP_{T1}$$

$$X_2 \leftarrow rP_{T2}$$

where r is randomly chosen in $Z_l^*$;

$$h \leftarrow H_2(C_1(\text{at least } X_1, X_2 \text{ and } m))$$

where $H_2: \{0,1\}^* \rightarrow Z_l$ and $C_1(\ )$ is a deterministic combination function, $$J \leftarrow (rR_{T1}+hS_A)$$

(b) encrypting m and signature data by computing:
w as the bilinear mapping of elements $Q_B$ and $rR_{T2}$, and $$f \leftarrow \text{Enc}(w, C_2(\text{at least } J \text{ and } m))$$

where Enc( ) is a symmetric-key encryption function using w as key, and $C_2(\ )$ is a reversible combination function;

(c) outputting ciphertext comprising $X_1$, $X_2$ and f.

In these preferred embodiments, the signature step is based on a modified form of the signature algorithm used by the Boyen prior art signcryption scheme described above. The encryption step uses a more efficient algorithm to that of Boyen; in fact, analysis shows that the encryption step uses an algorithm similar to the "BasicIdent" encryption algorithm described in the above-mentioned paper by Boneh and Franklin. However, the way the encryption step is carried out with respect to the signature step now ensures that the signcryption method of the preferred embodiments is secure against a chosen ciphertext attack unlike the "BasicIdent" algorithm itself.

According to a second aspect of the present invention, there is provided an identifier-based signcryption method in which a second party, associated with an element $Q_B$ formed from a second identifier string $ID_B$, decrypts and verifies received ciphertext <X', f> that is purportedly a signcryption of subject data m by a first party, associated with an element $Q_A$ formed from a first identifier string $ID_A$; the first party being associated with a first trusted authority that has a public key comprising elements P and $R_{T1}$ where $R_{T1}=s_1P$, and the second party being associated with a second trusted authority that has a public key comprising the element P and an element $R_{T2}$ where $R_{T2}=s_2P$, said elements being members of an algebraic group $G_0$ with at least the elements P, $R_{T1}$ and $R_{T2}$ being in a subgroup $G_1$ of $G_0$ where $G_1$ is of prime order l and in respect of which there exists a computable bilinear map p; the method comprising the second party:

(a) decrypting the received ciphertext by computing:

w' as a bilinear mapping of elements $S_B$ and X' where $S_B=s_2Q_B$ is a private key supplied by the second trusted authority and $s_2$ is a secret key held by that trusted authority;

Dec(w',f)

where Dec( ) is a symmetric-key decryption function using w' as key, with at least quantities J' and m' being recovered from the result;

(b) verifying that the ciphertext is from the first party by computing:

$$Q_A' \leftarrow H_1(ID_A')$$

where $H_1(\ )$ is a hash function;

$$h' \leftarrow H_2(C_1(\text{at least: } X' \text{ and } m'))$$

where $H_2: \{0,1\}^* \rightarrow Z_l$ and $C_1(\ )$ is a deterministic combination function, and then checking whether:

$$p(J',P)=p(R_{T1},X'+h'Q_A')$$

where $R_{T1}=s_1P$ and is formed by the first trusted authority, and $s_1$ is a secret key held by that trusted authority.

According to a third aspect of the present invention, there is provided an identifier-based signcryption method in which a second party, associated with an element $Q_B$ formed from a second identifier string $ID_B$, decrypts and verifies received ciphertext <X'$_1$, X'$_2$, f> that is purportedly a signcryption of subject data m by a first party, associated with an element $Q_A$ formed from a first identifier string $ID_A$; the first party being associated with a first trusted authority that has a public key comprising elements $P_{T1}$ and $R_{T1}$ where $R_{T1}=s_1P_{T1}$, and the second party being associated with a second trusted authority that has a public key comprising an element $P_{T2}$ and an element $R_{T2}$ where $R_{T2}=s_2P_{T2}$, said elements being members of an algebraic group $G_0$ with at least the elements $P_{T1}, P_{T2}, R_{T1}$ and $R_{T2}$ being in a subgroup $G_1$ of $G_0$ where $G_1$ is of prime order l and in respect of which there exists a computable bilinear map p; the method comprising the second party:

(a) decrypting the received ciphertext by computing:

w' as a bilinear mapping of elements $S_B$ and $X'_2$ where $S_B=s_2Q_B$ is a private key supplied by the second trusted authority and $s_2$ is a secret key held by that trusted authority;

Dec(w',f)

where Dec( ) is a symmetric-key decryption function using w' as key, with at least quantities J' and m' being recovered from the result;

(b) verifying that the ciphertext is from the first party by computing:

$$Q_A' \leftarrow H_1(ID_A')$$

where $H_1(\ )$ is a hash function;

$$h' \leftarrow H_2(C_1(\text{at least: } X'_1, X'_2 \text{ and } m'))$$

where $H_2: \{0,1\}^* \rightarrow Z_l$ and $C_1(\ )$ is a deterministic combination function, and then carrying out at least a check as to whether:

$$p(P_{T1},J')=p(R_{T1},X'_1+h'Q'_A).$$

where $R_{T1}=s_1P$ and is formed by the first trusted authority, and $s_1$ is a secret key held by that trusted authority.

It will be appreciated by persons skilled in the art that the pairings-based checks carried by the second party in the methods of the second and third aspects of the present invention, can be expressed in a variety of different forms due to the bilinear nature of the mapping p with each form of expression having a corresponding computational implementation. All implementations of the equivalent expressions effectively perform the same check and accordingly the foregoing statement of the invention is not to be read as restricted by the form of expression used to specify the check.

The present invention also encompasses apparatus, systems and computer program products embodying the methods of the invention.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

In the following description, $G_1$, $G_2$ are two groups of large prime order l for which there exists a non-degenerate computable bilinear map p: $G_1 \times G_1 \rightarrow G_2$ whereby for all $P_1, P_2 \in G_1$ and all integers a and b:

$$p(aP_1, bP_2) = p(P_1, P_2)^{ab}.$$

The construction for such groups normally (though not necessarily) uses supersingular elliptic curves over finite fields $F_q$ (where q is a prime power) and the use of such a curve will be assumed here (the curve $y^2 = x^3 + 1$ being used as an example). The corresponding bilinear map is a modification of the Weil/Tate pairing. Note that $G_1$ is a [l]-torsion group satisfying [l]P=O for all $P \in G_1$ where O is the infinite element, l is a large prime, and l*cofactor=number of points on curve in $F_q$.

In addition, three hash functions $H_1$, $H_2$ and $H_3$ are used with co-domains $G_1$, $Z^*_l$ and $\{0,1\}^{k_0+k_1+n}$ respectively, that is:

$$H_1: \{0,1\}^{k_1} \rightarrow G_1$$

$$H_2: \{0,1\}^{k_0+n} \rightarrow Z^*_l$$

$$H_3: G_2 \rightarrow \{0,1\}^{k_0+k_1+n}$$

where:
  $k_0$ is the number of bits required to represent an element of $G_1$;
  $k_1$ is the number of bits required to represent an identity; and
  n is the number of bits of a message to be signed and encrypted.

In the following, the notation $u \in_R V$ is used to denote u being selected uniformly at random from the set V.

Two embodiments of the invention are described below in which a party A is arranged to sign and encrypt a message m and send it to a second party B for decryption and verification of the signature. Both embodiments employ signcryption schemes in which the first party A uses a secret $S_A$ that is securely provided by a first trusted authority T1 and is based on a public identity of party A and a secret of the first trusted authority, and the second party B uses a secret $S_B$ that is securely provided by the second trusted authority and is based on a public identity of party B and a secret of the second trusted authority. In the first embodiment, both trusted authorities use the same master public point P on the same elliptic curve, in the second embodiment, the trusted authorities use different master public points, $P_{T1}$ and $P_{T2}$ respectively on the same elliptic curve.

Figure 1:
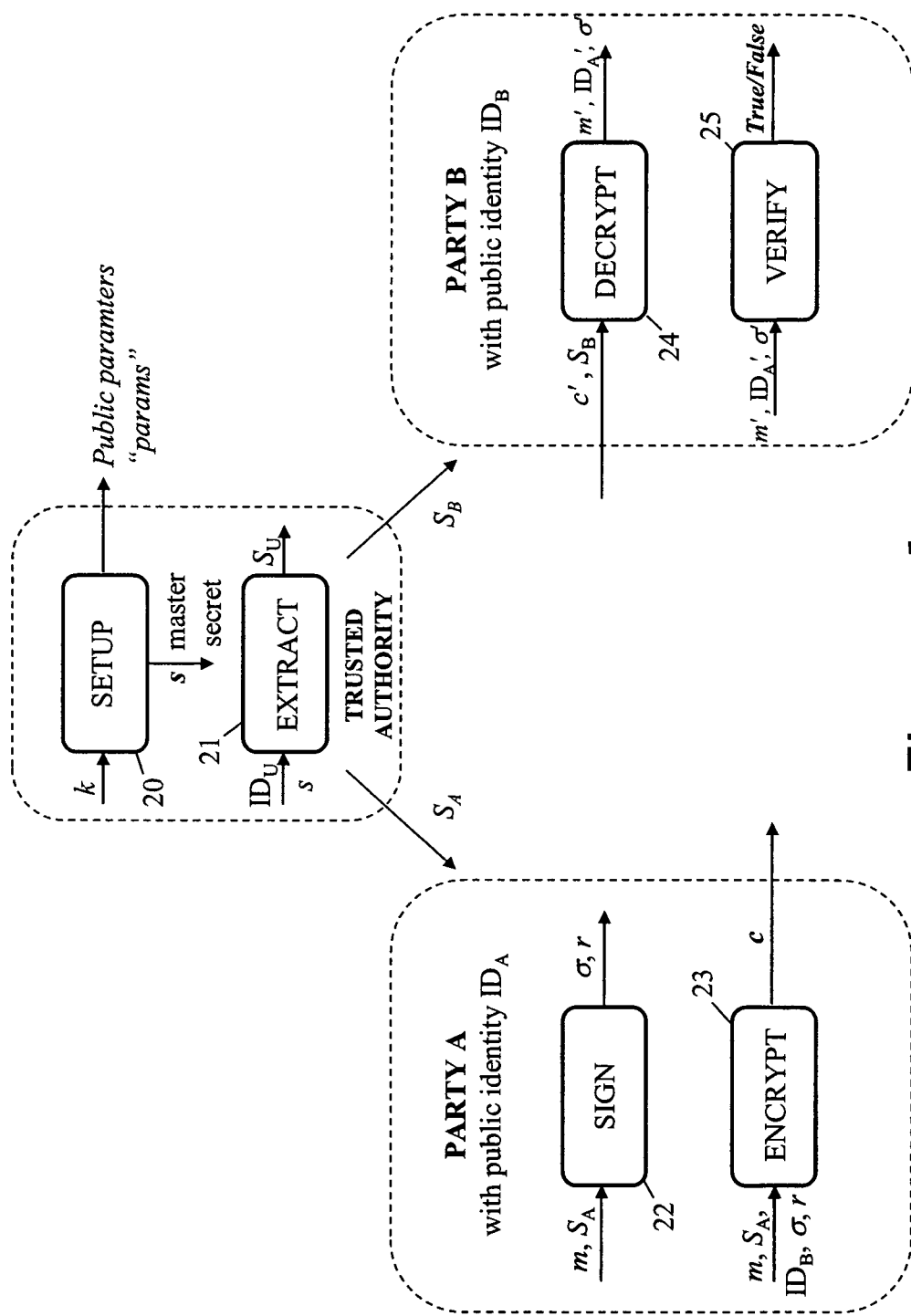
FIG. 1 is a diagram illustrating component algorithms of an identity-based signcryption scheme according to a prior-art proposal.

The signcryption schemes of the first and second embodiments will be described below in terms of the six algorithms SETUP, EXTRACT, SIGN, ENCRYPT, DECRYPT, and VERIFY described above and depicted in FIG. 1, it being appreciated that other models for describing the signcryption schemes of the first and second embodiments are also possible.

For both the first embodiment (illustrated in FIG. 2) and the second embodiment (illustrated in FIG. 3) the four parties involved act through respective computing entities. Thus, the first party A acting through computing entity 40, the second party B acts through computing entity 42, the first trusted authority T1 acts through computing entity 44, and the second trusted authority T2 acts through computing entity 46. The computing entities 40, 42, 44 and 46 are typically based around program-controlled processors though some or all of the cryptographic functions may be implemented in dedicated hardware. The entities 40, 42, 44 and 46 inter-communicate, for example, via the internet or other computer network 48 though it is also possible that two, three or all four entities actually reside on the same computing platform; alternatively data can be transferred between the computing entities using portable storage media.

For convenience, the following description is given in terms of the parties A, B, T1 and T2, it being understood that these parties act through their respective computing entities.

The details of the first embodiment will next be considered.

Setup

The SETUP algorithm (block 50 in FIG. 2) comprises the following steps:
  1. Establish public parameters $G_1$, $G_2$, l, q and the cryptographic hashes $H_1(\ )$, $H_2(\ )$ and $H_3(\ )$.
  2. Choose P such that $<P>=G_1$ that is, P is a generator for the cyclic group $G_1$.
  3. For each trusted authority T1 and T2, choose a secret s uniformly at random from $Z_l^*$; thus, T1 chooses its master private key $s_1 \in_R Z^*_l$, and T2 chooses its master private key $s_2 \in_R Z^*_l$;
  4. For each trusted authority T1 and T2 compute a corresponding derived public key element R←sP; thus T1 computes $R_{T1} \leftarrow s_1 P$ and T2 computes $R_{T2} \leftarrow s_2 P$.

Steps 1 and 2 of the SETUP algorithm can be performed by one or other of the trusted authorities T1, T2 or by any other entity.

Extract

To extract the private key for party U with $ID_U \in \{0,1\}^{k_1}$, the trusted authority with which the user is associated executes the following EXTRACT algorithm (block 51 in FIG. 2):
  1. Compute the public key for the party U; thus, for party A the first trusted authority T1 computes $Q_A \leftarrow H_1(ID_A)$, and for party B, the second trusted authority T2 computes $Q_B \leftarrow H_1(ID_B)$.
  2. Compute the secret key $S_U \leftarrow sQ_U$; thus, for the first party A the first trusted authority T1 computes $S_A \leftarrow s_1 Q_A$, and for the second party B, the second trusted authority T2 computes $S_B \leftarrow s_2 Q_B$.

The private keys for parties A and B are securely communicated to each party.

Sign

Party A with identity $ID_A$ signs a message $m \in \{0,1\}^n$ using private key $S_A$ corresponding to public key $Q_A \leftarrow s_1 H_1(ID_A)$ by executing the steps of the following SIGN algorithm (block 52 in FIG. 2):
  1. Chooses $r \in_R Z^*_l$
  2. Compute X←rP
  3. Compute h←$H_2$(X, m)
  4. Compute J←$rR_{T1} + hS_A$
  5. Forward r and the signature σ=<X, J> to ENCRYPT Encrypt Party A with identity $ID_A$ encrypts message m using the output of SIGN and the identity $ID_B$ of the intended receiver by executing the steps of the following ENCRYPT algorithm (block 53 in FIG. 2):
1. Compute $Q_B \leftarrow H_1(ID_B)$
2. Compute $w \leftarrow p(Q_B, rR_{T2})$
3. Compute $f \leftarrow H_3(w) \oplus (J\|ID_A\|m)$
   where $\|$ represents concatenation and $\oplus$ the Exclusive OR function.
4. Return ciphertext c: <X, f>

Party A then outputs the ciphertext c for receipt by party B. Party B receives ciphertext c' which is purportedly is ciphertext provided by party A (that is, ciphertext c).

Decrypt

Party B with identity $ID_B$ decrypts ciphertext c': <X', f> using $S_B \leftarrow s_2 H_1(ID_B)$ by executing the steps of the following DECRYPT algorithm (block 54 in FIG. 2):
1. Compute $w' \leftarrow p(S_B, X')$
2. Compute: $f' \oplus H_3(w')$ and, taking this to be the string: $J'\|ID_A'\|m'$, recover from this string its constituent components.
3. Return the message m', the signature $\sigma' = <X', J'>$, and the identity $ID_A'$ of the purported sender.

Verify

Party B then verifies the signature <X', J'> of party A on message m by executing the steps of the following VERIFY algorithm (block 55 in FIG. 2):
1. Compute $Q'_A \leftarrow H_1(ID'_A)$
2. Compute $h' \leftarrow H_2(X', m')$
3. Check whether:

$$p(P, J') = p(R_{T1}, X' + h'Q'_A)$$

if this check is passed, return True, otherwise return False.

The second embodiment will now be described with reference to FIG. 3, it being recalled that in the second embodiment, the trusted authorities use different master public points, $P_{T1}$ and $P_{T2}$ respectively on the same elliptic curve.

Setup

The SETUP algorithm (block 60 in FIG. 3) comprises the following steps:
1. Establish public parameters $G_1$, $G_2$, l, q and the cryptographic hashes $H_1( )$, $H_2( )$ and $H_3( )$.
2. For each trusted authority T1 and T2, obtain P such that <P>=$G_1$ that is, P is a generator for the cyclic group $G_1$, the chosen points being such that they are not easily related; thus, trusted authority T1 obtains $P_{T1}$ and the trusted authority T2 obtains $P_{T2}$.
3. For each trusted authority T1 and T2, choose a secret s uniformly at random from $Z_l^*$; thus, T1 chooses its master private key $s_1 \in_R Z_l^*$, and T2 chooses its master private key $s_2 \in_R Z_l^*$.
4. For each trusted authority T1 and T2, compute a corresponding derived public key element $R \leftarrow sP$; thus T1 computes $R_{T1} \leftarrow s_1 P_{T1}$ and T2 computes $R_{T2} \leftarrow s_2 P_{T2}$.

Step 1 of the SETUP algorithm can be performed by either one of the trusted authorities T1, T2 or by any other entity. With regard to step 2, in order to avoid cryptographic weakness arising from the two points $P_{T1}$ and $P_{T2}$ chosen by the trusted authorities T1 and T2 being easily related, the points are preferably derived from respective identifier strings, $ID_{T1}$ and $ID_{T2}$ of the trusted authorities T1 and T2. Thus:

$$P_{T1} = H_1(ID_{T1}) \text{ and } P_{T2} = H_1(ID_{T2}).$$

Each trusted party can choose its identifier string at random or as any meaningful information of the trusted authority (for example, a contact address such as the URL of a website of the trusted authority) together with a definition of the identifier string formats that it accepts from users for private key generation in step 4. Providing such meaningful information in the string from which $P_{T1}/P_{T2}$ can be generated by any party gives a convenient way of distributing such information.

Extract

To extract the private key for party U with $ID_U \in \{0,1\}^{k_1}$, the trusted authority with which the user is associated executes the following EXTRACT algorithm (block 61 in FIG. 3):
1. Compute the public key for the party U; thus, for party A the first trusted authority T1 computes $Q_A \leftarrow H_1(ID_A)$, and for party B, the second trusted authority T2 computes $Q_B \leftarrow H_1(ID_B)$.
2. Compute the secret key $S_U \leftarrow sQ_U$; thus, for the first party A the first trusted authority T1 computes $S_A \leftarrow s_1 Q_A$, and for the second party B, the second trusted authority T2 computes $S_B \leftarrow s_2 Q_B$.

The private keys for parties A and B are securely communicated to each party.

Sign

Party A with identity $ID_A$ signs a message $m \in \{0,1\}^n$ using private key $S_A$ corresponding to public key $Q_A \leftarrow s_1 H_1(ID_A)$ by executing the steps of the following SIGN algorithm (block 62 in FIG. 3):
1. Chooses $r \in_R Z_l^*$
2. Compute $X_1 = rP_{T1}$ and $X_2 = rP_{T2}$
3. Compute $h = H_2(X_1, X_2, m)$
4. Compute $J \leftarrow rR_{T1} + hS_A$
5. Forward r and the signature $\sigma = <X_1, X_2, J>$ to ENCRYPT Encrypt Party A with identity $ID_A$ encrypts message m using the output of SIGN and the identity $ID_B$ of the intended receiver by executing the steps of the following ENCRYPT algorithm (block 63 in FIG. 3):
1. Compute $Q_B \leftarrow H_1(ID_B)$
2. Compute $w \leftarrow p(Q_B, rR_{T2})$
3. Compute $f \leftarrow H_3(w) \oplus (J\|ID_A\|m)$
4. Return ciphertext c: <$X_1$, $X_2$, f>

Party A then outputs the ciphertext c for receipt by party B. Party B receives ciphertext c' which is purportedly is ciphertext provided by party A (that is, ciphertext c).

Decrypt

Party B with identity $ID_B$ decrypts ciphertext c': <$X'_1$, $X'_2$, f> using $S_B \leftarrow s_2 H_1(ID_B)$ by executing the steps of the following DECRYPT algorithm (block 64 in FIG. 3):
1. Compute $w' \leftarrow p(S_B, X'_2)$
2. Compute: $f' \oplus H_3(w')$ and, taking this to be the string: $J'\|ID_A'\|m'$, recover from this string its constituent components.
3. Return the message m', the signature $\sigma' = <X'_1, X'_2, J'>$, and the identity $ID_A'$ of the purported sender.

Verify

Party B then verifies the signature <$X'_1$, $X'_2$, J'> of party A on message m by executing the steps of the following VERIFY algorithm (block 65 in FIG. 3):
1. Compute $Q'_A \leftarrow H_1(ID'_A)$
2. Compute $h' \leftarrow H_2(X'_1, X'_2, m')$
3. Check whether:

$$p(P_{T1}, J') = p(R_{T1}, X'_1 + h'Q'_A), \text{ and}$$

$$p(X'_1, P_{T2}) = p(P_{T1}, X'_2)$$

if both checks are passed, return True, otherwise return False.

Note that the second test of step 3 above is used to check if the signer and the encryptor are the same entity. If this issue is not of concern, this test can be ignored.

Figure 2:
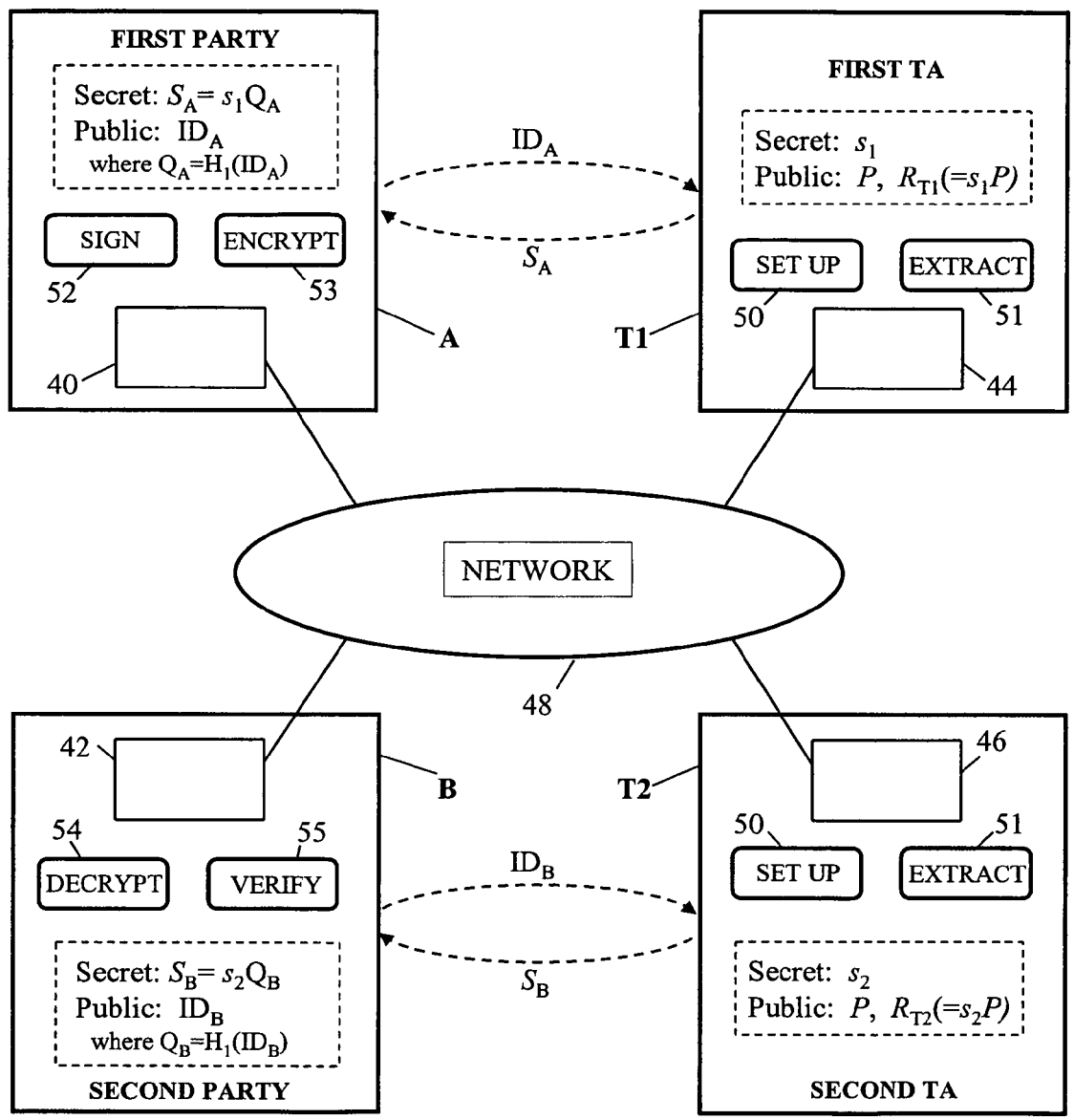
FIG. 2 is a diagram of a first system embodying the present invention.
Figure 3:
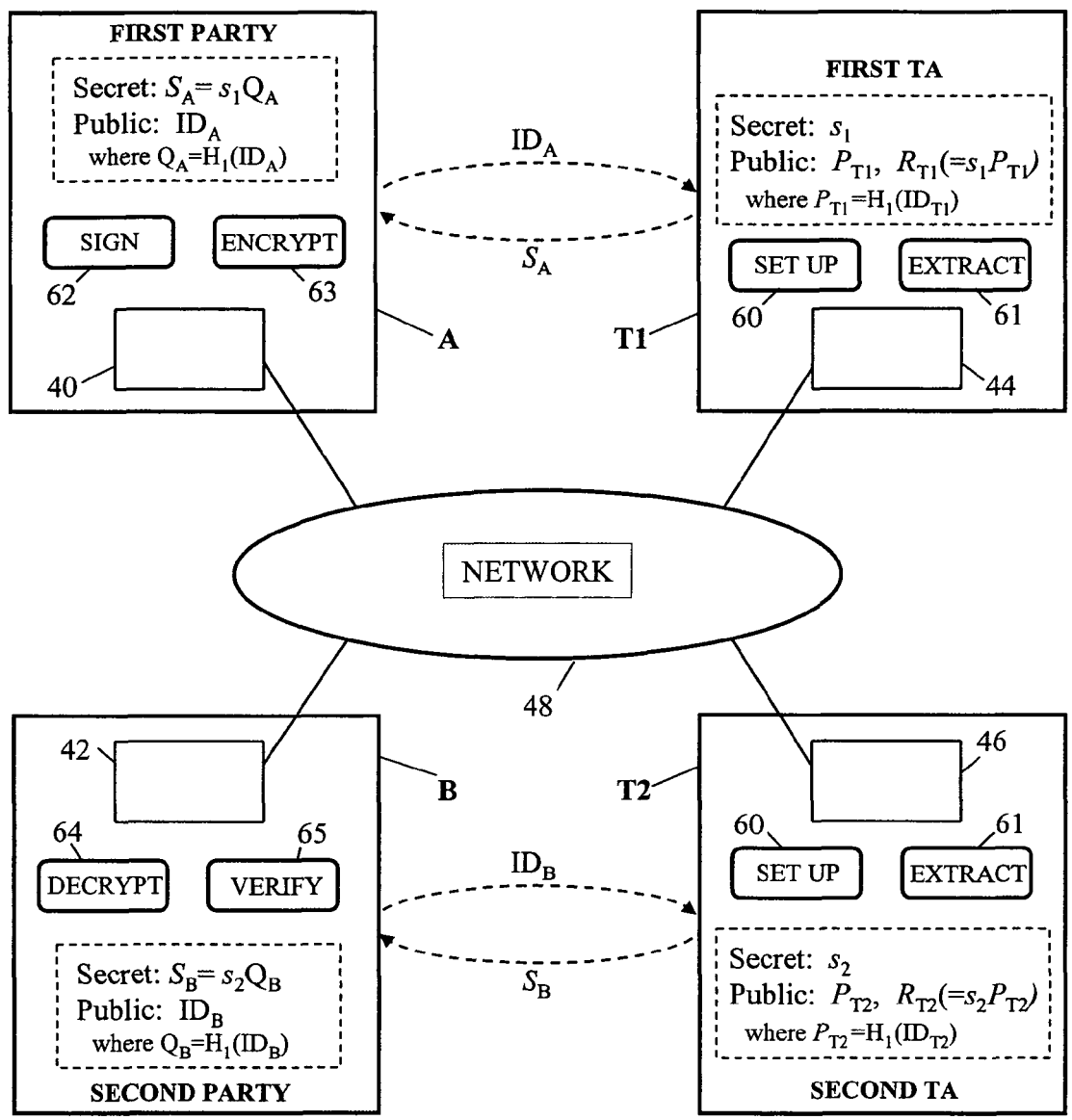
FIG. 3 is a diagram of a second system embodying the present invention.

The signcryption schemes of FIGS. 2 and 3 offer the advantages of being suitable for situations where the message sender and receiver belong to different trusted-authority domains (which is the more general case), and are reasonably efficient compared with the prior solutions for such situations.

It will be appreciated that the generation of $S_A$ by the trusted authority T1 will typically only be done after T1 had checked the entitlement of party A to the identity $ID_A$; similarly the trusted authority T2 will generally only generate $S_B$ after checking the entitlement of party B to the identity $ID_B$ (it is noted that in many applications $S_B$ will only be generated after party B has received the signcrypted message—in other words, it is not required that all steps of EXTRACT be carried out together before another of the algorithms is commenced).

It will be appreciated that many variants are possible to the above described embodiments of the invention. For example, in the ENCRYPT algorithm used in FIGS. 2 and 3 (blocks 53 and 63), the computation:

$$f \leftarrow H_3(w) \oplus (J\|ID_A\|m)$$

can be replaced by any symmetric-key encryption process $Enc(w, J\|ID_A\|m)$ taking w as the encryption key for encrypting the string $(J\|ID_A\|m)$; any deterministic processing carried out on w before it is used in the underlying encryption algorithm is taken to reside in Enc( ). In this case, in DECRYPT (blocks 54, 64) the corresponding computation:

$$f \oplus H_3(w')$$

is replaced by the corresponding symmetric-key decryption operation $Dec(w', J'\|ID_A'\|m')$ using w' as the key.

In the embodiments described above with reference to FIGS. 2 and 3, the ciphertext is anonymous in that the identity of the signer is not discernible except by party B; this is as a result of the identity $ID_A$ of party A being concatenated with m and J for encryption. If anonymity is not required, then the identity $ID_A$ of party A can be sent unencrypted as a separate element (any change to this identity before delivery to party B resulting in the verification step failing).

It will be appreciated that the order of concatenation of concatenated components does not matter provided this is known to both parties A and B. Indeed, these components can be combined in ways other than by concatenation. Thus, the concatenation carried out during signing and verification can be replaced by any deterministic combination function, whilst the concatenation carried out during encryption can be replaced by any combination function that is reversible (as the decryption process needs to reverse the combination done in the encryption process). It is also possible to include additional components into the set of components subject to combination.

It will be further appreciated that the message m can comprises any subject data including text, an image file, a sound file, an arbitrary string, etc.

In the foregoing description of embodiments of the invention it has been assumed that all the elements P (or $P_{T1}$, $P_{T2}$), $Q_A$ and $Q_B$ (and their derivatives R (or $R_{T1}$, $R_{T2}$), $S_A$, $S_B$) are members of $G_1$ and that the bilinear map p has the form:

$$p: G_1 \times G_1 \rightarrow G_2$$

with both the Weil and Tate pairings being suitable implementations of the map. In fact, it is also possible for one or both of the elements $Q_A$, $Q_B$ not to be restricted to $G_1$ provided they are in $G_0$; in this case, the bilinear map can be of the form:

$$p: G_1 \times G_0 \rightarrow G_2$$

with the Tate pairing being a suitable implementation. Where it is $Q_B$ that is unrestricted to $G_1$, then the order of the elements in the pairings used for determining w and w' in the foregoing embodiments described with respect to FIGS. 2 and 3 should be reversed (so that the element constituted by, or based on, $Q_B$ is the second element of the pairing). It will be appreciated that the co-domain of the hash function $H_1()$ is $G_0$ where it is to be used to convert one or both of the identities $ID_A$ and $ID_B$ into elements in $G_0$ without the restriction of being in $G_1$. Different versions of $H_1()$ can be provided where only one of $Q_A$ and $Q_B$ is unrestricted to $G_0$, one with a co-domain of $G_1$ and the other with a co-domain of $G_0$. For the FIG. 3 embodiment, where $H_1()$ is used to form the elements $P_{T1}$ and $P_{T2}$, the version of $H_1()$ used for this should have a co-domain of $G_1$.

The invention claimed is:

1. An identifier-based signcryption method using bilinear maps comprising:
   a first party associated with a first identifier string $ID_A$ signcrypting data m intended for a second party associated with a second identifier string $ID_B$, the first and second parties being respectively associated with first and second trusted authorities that have different respective public keys and different respective private keys $s_1$ and $s_2$;
   with a programmed computing entity in communication with a computer network, the first party receives from the first trusted authority a private-key element $S_A$ based on the first identifier string $ID_A$ and the first trusted party's private key $s_1$, and
   with the programmed computing entity in communication with the computer network, the first party signcrypts the data m using a hash function that accepts as input at least the public keys of the first and second trusted authorities, signcrypting the data m further using said first party's own private-key element $S_A$ and the second identifier string $ID_B$.

2. A method according to claim 1, wherein the public key of the first trusted authority comprises elements P and $R_{T1}$ where $R_{T1}=s_1P$, and the public key of the second trusted authority comprises the element P and an element $R_{T2}$ where $R_{T2}=s_2P$; the private-key element $S_A$ of the first party being formed as $s_1Q_A$ where $Q_A$ is an element formed from the first identifier string $ID_A$, and the second party having an associated element $Q_B$ formed from the second identifier string $ID_B$, said elements being members of an algebraic group $G_0$ with at least the elements P, $R_{T1}$ and $R_{T2}$ being in a subgroup $G_1$ of $G_0$ where $G_1$ is of prime order l and in respect of which there exists a computable bilinear map p; the first party signcrypting the data m by a process comprising:
   (a) signing m by computing:

$$X \leftarrow rP$$

where r is randomly chosen in $Z_l^*$;

$$h \leftarrow H_2(C_1(\text{at least } X \text{ and } m))$$

where $H_2: \{0,1\}^* \rightarrow Z_l$ and $C_1()$ is a deterministic combination function, $$J \leftarrow (rR_{T1} + hS_A)$$

(b) encrypting m and signature data by computing:
      w as the bilinear mapping of elements $Q_B$, and $rR_{T2}$, and $$f \leftarrow Enc(w, C_2(\text{at least } J \text{ and } m))$$

where Enc( ) is a symmetric-key encryption function using w as key, and $C_2()$ is a reversible combination function;
   (c) outputting ciphertext comprising X and f.

3. A method according to claim 2, wherein in step (b) the set of quantities to which the combination function $C_2()$ is applied comprises at least J, m and the identity $ID_A$ of the first party, whereby this identity is encrypted in the ciphertext.

4. A method according to claim 2, wherein in step (c) the identity $ID_A$ of the first party is output in unencrypted form along with X and f.

5. A method according to claim 2, wherein at least one of the functions $C_1(\ )$ and $C_2(\ )$ is a concatenation function.

6. A method according to claim 2, wherein the symmetric-key encryption function Enc( ) effects at least the followings operations:
   forming a hash of the key w;
   forming an Exclusive-OR of the hash of w with the output of the combination function $C_2(\ )$.

7. A method according to claim 2, wherein all said elements are in the subgroup $G_1$ and the bilinear map p is of the form:

$$p: G_1 \times G_1 \to G_2$$

where $G_2$ is a subgroup of a multiplicative group of a finite field.

8. A method according to claim 7, wherein the bilinear map is a Weil or Tate pairing.

9. A method according to claim 2, wherein only the public key elements of the trusted authorities are restricted to the subgroup $G_1$ and the bilinear map p is of the form:

$$p: G_1 \times G_0 \to G_2$$

where $G_2$ is a subgroup of a multiplicative group of a finite field.

10. A method according to claim 9, wherein the bilinear map is a Tate pairing.

11. A method according to claim 1, wherein the public key of the first trusted authority comprises an element $P_{T1}$ and an element $R_{T1}$ where $R_{T1}=s_1P_{T1}$, and the public key of the second trusted authority comprises an element $P_{T2}$ and an element $R_{T2}$ where $R_{T2}=s_2P_{T2}$; the private-key element $S_A$ of the first party being formed as $s_1Q_A$ where $Q_A$ is an element formed from the first identifier string $ID_A$, and the second party having an associated element $Q_B$ formed from the second identifier string $ID_B$, said elements being members of an algebraic group $G_0$ with at least the elements $P_{T1}, P_{T2}, R_{T1}$ and $R_{T2}$ being in a subgroup $G_1$ of $G_0$ where $G_1$ is of prime order/and in respect of which there exists a computable bilinear map p; the first party signcrypting the data m by a process comprising:
   (a) signing m by computing:

$$X_1 \leftarrow rP_{T1}$$

$$X_2 \leftarrow rP_{T2}$$

where r is randomly chosen in $Z_l^*$;

$$h \leftarrow H_2(C_1(\text{at least } X_1, X_2 \text{ and } m))$$

where $H_2: \{0,1\}^* \to Z_l$ and $C_1(\ )$ is a deterministic combination function, $$J \leftarrow (rR_{T1} + hS_A)$$

(b) encrypting m and signature data by computing:
   w as the bilinear mapping of elements $Q_B$ and $rR_{T2}$, and $$f \leftarrow \text{Enc}(w, C_2(\text{at least } J \text{ and } m))$$

where Enc( ) is a symmetric-key encryption function using w as key, and $C_2(\ )$ is a reversible combination function;
   (c) outputting ciphertext comprising $X_1$, $X_2$ and f.

12. A method according to claim 11, wherein in step (b) the set of quantities to which the combination function $C_2(\ )$ is applied comprises at least J, m and the identity $ID_A$ of the first party, whereby this identity is encrypted in the ciphertext.

13. A method according to claim 11, wherein in step (c) the identity $ID_A$ of the first party is output in unencrypted form along with $X_1$, $X_2$ and f.

14. A method according to claim 11, wherein at least one of the functions $C_1(\ )$ and $C_2(\ )$ is a concatenation function.

15. A method according to claim 11, wherein the symmetric-key encryption function Enc( ) effects at least the followings operations:
   forming a hash of the key w;
   forming an Exclusive-OR of the hash of w with the output of the combination function $C_2(\ )$.

16. A method according to claim 11, wherein all said elements are in the subgroup $G_1$ and the bilinear map p is of the form:

$$p: G_1 \times G_1 \to G_2$$

where $G_2$ is a subgroup of a multiplicative group of a finite field.

17. A method according to claim 16, wherein the bilinear map is a Weil or Tate pairing.

18. A method according to claim 11, wherein only the public key elements of the trusted authorities are restricted to the subgroup $G_1$ and the bilinear map p is of the form:

$$p: G_1 \times G_0 \to G_2$$

where $G_2$ is a subgroup of a multiplicative group of a finite field.

19. A method according to claim 18, wherein the bilinear map is a Tate pairing.

20. Apparatus for use in a signcryption method in which a first party has an associated first identifier string $ID_A$, a second party has an associated second identifier string $ID_B$, a first trusted authority has a private key $s_1$ and a public key comprising elements P and $R_{T1}$ where $R_{T1}=s_1P$, a second trusted authority has a private key $s_2$ and a public key comprising the element P and an element $R_{T2}$ where $R_{T2}=s_2P$, the first trusted authority is arranged to form a private-key element $S_A$ for the first party as $s_1Q_A$ where $Q_A$ is an element formed from the first identifier string $ID_A$, and the second party has an associated element $Q_B$ formed from the second identifier string $ID_B$, said elements being members of an algebraic group $G_0$ with at least the elements P, $R_{T1}$ and $R_{T2}$ being in a subgroup $G_1$ of $G_0$ where $G_1$ is of prime order/and in respect of which there exists a computable bilinear map p; the apparatus comprising a computing entity programmed to signcrypt data m for the first party, said computing entity comprising:
   a signing arrangement arranged to sign m by computing:

$$X \leftarrow rP$$

where r is randomly chosen in $Z_l^*$;

$$h \leftarrow H_2(C_1(\text{at least } X \text{ and } m))$$

where $H_2: \{0,1\}^* \to Z_l$ and $C_1(\ )$ is a deterministic combination function, $$J \leftarrow (rR_{T1} + hS_A)$$

an encryption arrangement arranged to encrypt m and signature data by computing:
   w as the bilinear mapping of elements $Q_B$, and $rR_{T2}$, and $$f \leftarrow \text{Enc}(w, C_2(\text{at least } J \text{ and } m))$$

where Enc( ) is a symmetric-key encryption function using w as key, and $C_2(\ )$ is a reversible combination function;
   an output arrangement for outputting ciphertext comprising X and f.

21. Apparatus according to claim 20, wherein the encryption arrangement is arranged to apply the combination function $C_2()$ to a set of quantities comprising at least J, m and the identity $ID_A$ of the first party, whereby this identity is encrypted in the ciphertext.

22. Apparatus for use in a signcryption method in which a first party has an associated first identifier string $ID_A$, a second party has an associated second identifier string $ID_B$, a first trusted authority has a private key $s_1$ and a public key comprising an element $P_{T1}$ and an element $R_{T1}$ where $R_{T1}=s_1P_{T1}$, a second trusted authority has a private key $s_2$ and a public key comprising an element $P_{T2}$ and an element $R_{T2}$ where $R_{T2}=s_2P_{T2}$, the first trusted authority is arranged to form a private-key element $S_A$ for the first party as $s_1Q_A$ where $Q_A$ is an element formed from the first identifier string $ID_A$, and the second party has an associated element $Q_B$ formed from the second identifier string $ID_B$, said elements being members of an algebraic group $G_0$ with at least the elements $P_{T1}$, $P_{T2}$, $R_{T1}$ and $R_{T2}$ being in a subgroup $G_1$ of $G_0$ where $G_1$ is of prime order/and in respect of which there exists a computable bilinear map p; comprising a computing entity programmed to signcrypt data m for the first party, said computing entity comprising:

a signing arrangement arranged to sign m by computing:

$$X_1 \leftarrow rP_{T1}$$

$$X_2 \leftarrow rP_{T2}$$

where r is randomly chosen in $Z_l^*$;

$$h \leftarrow H_2(C_1(\text{at least } X_1, X_2 \text{ and } m))$$

where $H_2: \{0,1\}^* \rightarrow Z_l$ and $C_1()$ is a deterministic combination function, $$J \leftarrow (rR_{T1}+hS_A)$$

an encryption arrangement arranged to encrypt m and signature data by computing:
w as the bilinear mapping of elements $Q_B$ and $rR_{T2}$, and $$f \leftarrow \text{Enc}(w, C_2(\text{at least } J \text{ and } m))$$

where Enc( ) is a symmetric-key encryption function using w as key, and $C_2()$ is a reversible combination function;

an output arrangement for outputting ciphertext comprising $X_1$, $X_2$ and f.

23. Apparatus according to claim 22, wherein the encryption arrangement is arranged to apply the combination function $C_2()$ to a set of quantities comprising at least J, m and the identity $ID_A$ of the first party, whereby this identity is encrypted in the ciphertext.

* * * * *

UNITED STATES PATENT AND TRADEMARK OFFICE
CERTIFICATE OF CORRECTION

PATENT NO. : 8,589,679 B2  Page 1 of 1
APPLICATION NO. : 11/182527
DATED : November 19, 2013
INVENTOR(S) : Liqun Chen et al.

It is certified that error appears in the above-identified patent and that said Letters Patent is hereby corrected as shown below:

In the Claims

In column 14, line 17, in Claim 1, delete "data" and insert -- message data --, therefor.

In column 14, line 30, in Claim 1, delete "data" and insert -- message data --, therefor.

In column 14, line 31, in Claim 1, after "authorities," insert -- wherein the first party --.

In column 14, line 32, in Claim 1, delete "data" and insert -- message data --, therefor.

In column 15, line 42, in Claim 11, delete "order/" and insert -- order I --, therefor.

In column 16, line 43, in Claim 20, delete "order/" and insert -- order I --, therefor.

In column 17, line 23, in Claim 22, delete "order/" and insert -- order I --, therefor.

Signed and Sealed this
Twenty-second Day of April, 2014

Michelle K. Lee
*Deputy Director of the United States Patent and Trademark Office*